US009777189B2

(12) United States Patent
Shen

(10) Patent No.: US 9,777,189 B2
(45) Date of Patent: Oct. 3, 2017

(54) CURABLE COMPOSITION

(71) Applicant: Kaneka North America LLC, Osaka (JP)

(72) Inventor: Chin-Chang Shen, Pasadena, TX (US)

(73) Assignee: Kaneka North America LLC, Pasadena, TX (US)

( * ) Notice: Subject to any disclaimer, the term of this patent is extended or adjusted under 35 U.S.C. 154(b) by 0 days.

(21) Appl. No.: 14/931,299

(22) Filed: Nov. 3, 2015

(65) Prior Publication Data

US 2016/0194443 A1 Jul. 7, 2016

Related U.S. Application Data

(60) Provisional application No. 62/074,304, filed on Nov. 3, 2014.

(51) Int. Cl.
| | |
|---|---|
| *C09D 171/02* | (2006.01) |
| *C09J 171/02* | (2006.01) |
| *C08G 65/336* | (2006.01) |

(52) U.S. Cl.
CPC ......... *C09D 171/02* (2013.01); *C08G 65/336* (2013.01); *C09J 171/02* (2013.01)

(58) Field of Classification Search
None
See application file for complete search history.

(56) References Cited

U.S. PATENT DOCUMENTS

| | | | |
|---|---|---|---|
| 3,632,557 A | 1/1972 | Brode et al. | |
| 4,345,053 A | 8/1982 | Rizk et al. | |
| 4,366,307 A | 12/1982 | Singh et al. | |
| 4,960,844 A | 10/1990 | Singh | |
| 5,962,620 A * | 10/1999 | Reich | A61K 8/87 |
| | | | 528/28 |
| 6,713,599 B1 * | 3/2004 | Hinz | C08G 18/4866 |
| | | | 528/403 |
| 2006/0127676 A1 * | 6/2006 | Sonezaki | C08J 7/047 |
| | | | 428/412 |
| 2010/0092787 A1 * | 4/2010 | Deike | C08G 65/336 |
| | | | 428/447 |
| 2010/0105804 A1 * | 4/2010 | Deike | C09D 171/02 |
| | | | 523/122 |
| 2012/0219802 A1 * | 8/2012 | Hilgers | C08G 18/44 |
| | | | 428/412 |
| 2013/0211042 A1 * | 8/2013 | Gurtler | C08G 64/34 |
| | | | 528/405 |
| 2014/0024795 A1 * | 1/2014 | Allen | C08G 18/44 |
| | | | 528/29 |
| 2014/0088219 A1 * | 3/2014 | Chen | C09D 5/1662 |
| | | | 523/122 |
| 2014/0190369 A1 * | 7/2014 | Peiffer | C08G 18/48 |
| | | | 106/287.11 |
| 2015/0038664 A1 * | 2/2015 | Hayashi | C08G 65/10 |
| | | | 528/29 |
| 2015/0232606 A1 * | 8/2015 | Wamprecht | C08G 18/73 |
| | | | 528/58 |

FOREIGN PATENT DOCUMENTS

| | | |
|---|---|---|
| JP | S61164123 A | 7/1986 |
| JP | S61215622 A | 9/1986 |
| JP | S61215623 A | 9/1986 |
| JP | S61218632 A | 9/1986 |
| JP | H032450 B2 | 1/1991 |
| JP | H0347825 A | 2/1991 |
| JP | H0372527 A | 3/1991 |
| JP | H08231707 A | 9/1996 |
| WO | 2012070666 A1 | 5/2012 |

OTHER PUBLICATIONS

Technical data sheet for Converge Polyol 212-10, 1 page, no date given.*
Technical data sheet for Converge Polyol 212-20, 1 page, no date given.*

* cited by examiner

*Primary Examiner* — Robert S Loewe
(74) *Attorney, Agent, or Firm* — Lerner, David, Littenberg, Krumholz & Mentlik, LLP

(57) ABSTRACT

Compositions are disclosed herein. In some embodiments, a composition includes a silyl terminated polymer, wherein the silyl terminated polymer includes a monomer unit represented by —($R_1$O)—, and a terminal silicon-containing group, wherein $R_1$ is a linear or branched alkyl group, and a polyether carbonate polyol including a terminal hydroxyl group.

18 Claims, No Drawings

CURABLE COMPOSITION

CROSS-REFERENCE TO RELATED APPLICATION

The present application claims the benefit of the filing date of U.S. Provisional Patent Application No. 62/074,304, filed Nov. 3, 2014, the disclosure of which is hereby incorporated herein by reference.

FIELD OF THE INVENTION

The present invention generally relates to curable compositions including silyl terminated polymers and modified carbonate polyols, and to sealants, adhesives, and coating compositions made therefrom.

BACKGROUND OF THE INVENTION

Silyl terminated polymers can have improved properties over conventional polymers, such as polyurethane, used in sealants, adhesives, and/or coating compositions. Improved properties may include elasticity, flexibility, tensile strength, adhesion on a wide range of substrate materials, temperature resistance, ultraviolet (UV) light resistance, ability to be painted even when wet, and absence of isocyanates, which can cause conditions, such as asthma and skin irritation, among others.

Despite the above described advances in the art, still further improvements in compositions including silyl terminated polymers would be desirable.

BRIEF SUMMARY OF THE INVENTION

Compositions including silyl terminated polymer and polyether carbonate polyol are disclosed herein. In some embodiments, the silyl terminated polymer includes a polyether polymer having silyl terminal groups. The compositions can be sealants, adhesives, and/or coating compositions. The compositions have improved properties, including toughness, surface tacky and adhesion on a variety of surfaces, compared to a composition including silyl terminated polymer alone. The compositions are found to have good stability over periods of several months, indicating good compatibility between the polymers of the mixture.

DETAILED DESCRIPTION

Compositions including silyl terminated polymers are disclosed herein. In some embodiments, the compositions can be sealants, adhesives, or coating compositions. The compositions include a mixture of a silyl terminated polymer and a polyether carbonate polyol. The polyether carbonate polyol advantageously has good compatibility with the silyl terminated polymer. The term 'good compatibility' meaning that upon curing the composition in the presence of a curing agent, such as water, cross-linking of the silyl terminated polymer and the polyether carbonate polyol has at least one improved property when compared to cross-linking of the silyl terminated polymer alone. The compositions of the present invention have improved properties with respect to various aspects of performance as discussed herein.

As used herein, the term "silyl terminated polymer" means a polymer having at least some terminal ends of the polymer capped with a silyl group. In some embodiments, all terminal ends of the polymer can be capped with a silyl group. In some embodiments, the silyl terminated polymer includes at least one monomer unit that is an ether, e.g., —(RO)—, where R is a linear or branched alkyl group. The silyl terminated polymer can be a co-polymer, for example, including one or more monomer units. In some embodiments, the silyl terminated polymer can be a co-polymer include an ether monomer unit and another monomer unit, or alternatively, more than one type of ether monomer unit. The silyl terminated polymer may be linear or branched. An exemplary linear silyl terminated polymer can include a linear chain of monomer units, wherein the chain is capped on opposing terminal ends by silyl groups. An exemplary branched silyl terminated polymer can include chains of monomer units networked together in a branched structure, wherein at least some of the chains having exposed terminal ends are capped by silyl groups.

In some embodiments, a silyl terminated polymer can be represented by Formula 1:

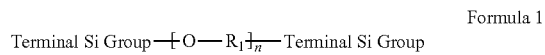

Formula 1

One of ordinary skill in the art will understand that the polymer represented by Formula 1 can be linear or branched silyl terminated polymer as described herein. Exemplary polymers than can comprise the polymer chains of a polyether portion of the silyl terminated polymer can include polyoxyethylene polymers, polyoxypropylene polymers, polyoxybutylene polymers, among other polymers. The polyether portion of the silyl terminated polymer can be derived from aliphatic alkylene oxides such as ethylene oxide, propylene oxide, 1,2-butylene oxide, 2,3-butylene oxide, epichlorohydrin and tetramethylene oxide, and from aromatic alkylene oxides such as styrene oxide. Exemplary $R_1$ in Formula 1 can be linear or branched alkyl groups, for example, include —$CH_2$—, —$CH_2CH_2$—, —$CH_2CH(CH_3)$—, —$CH_2CH(CH_2CH_3)$—, —$CH(CH_3)CH(CH_3)$—, —$CH_2CH_2CH_2CH_2$—; halogen-containing groups, for example, —$CH_2CH(CH_2Cl)$; and/or aromatic groups, for example, —$CH_2CH(C_6H_5)$—.

The terminal groups of the silyl terminated polymer can be silicon-containing groups. In some embodiments, the silicon-containing groups can include silyl groups. At least some of the terminal groups are reactive silicon-containing groups capable of cross-linking with other groups to form a siloxane bond. The silyl terminated polymers can, in some embodiments, self cross-link, such as with each other. Alternatively, or in combination, the silyl terminated polymers may cross-link with a polyether carbonate polyol as discussed herein.

Exemplary terminal groups that are reactive silicon-containing groups can include hydroxyl or hydrolizable groups bonded to a silicon atom. These reactive silicon-containing groups can be cross-linked by forming a siloxane bond through a reaction catalyzed by a curing agent. For example, water may be a curing agent, and the compositions can be moisture-sensitive.

One exemplary reactive silicon-containing group is represented by Formula 2:

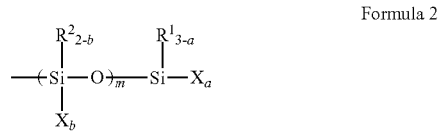

Formula 2

Each $R^1$ and $R^2$ represents a C1 to C20 alkyl group, a C6 to C20 aryl group, a C7 to C20 aralkyl group, a C1 to C10 α-haloalkyl group, or a triorganosiloxy group represented by $R'_3SiO$— (wherein R' is a C1 to C20 monovalent hydrocarbon group, and three R's may be the same or different), and in the case that there are two or more $R^1$s or $R^2$s, they may be the same or different; X represents a hydroxy group or hydrolyzable group, and in the case that there are two or more Xs, they may be the same or different; a represents an integer from 0 to 3; b represents an integer from 0 to 2, wherein b in each repeat unit m can be the same or different; m represents an integer from 0 to 19, provided that a+(sum of b in all m repeat units)≥1.

Exemplary $R^1$ and $R^2$ include alkyl groups such as methyl and ethyl, cycloalkyl groups such as cyclohexyl, aryl groups such as phenyl, aralkyl groups such as benzyl, α-chloroalkyl groups such as α-chloromethyl, and triorganosiloxy groups represented by $R'_3SiO$— wherein R' is methyl, phenyl, or the like. Among these, methyl is preferable in terms of the balance between the curability and stability of the polymer, and α-chloromethyl is preferable in terms of particularly high curing rate of the curable composition. Particularly preferable among these is methyl in terms of easy availability.

The hydrolyzable group represented by X is not particularly limited, and may be any conventionally known hydrolyzable group. Exemplary hydrolyzable groups can include a hydrogen atom, a halogen atom, an alkoxy group, an acyloxy group, a ketoxymate group, an amino group, an amide group, an acid amide group, an aminooxy group, a mercapto group, and an alkenyloxy group. Preferable among these are a hydrogen atom, an alkoxy group, an acyloxy group, a ketoxymate group, an amino group, an amide group, an aminooxy group, a mercapto group, and an alkenyloxy group. Particularly preferable is an alkoxy group because it contributes to mild hydrolysis and is easy to handle.

One to three hydrolyzable groups or hydroxy groups can be bonded to one silicon atom, and a+(sum of bs) is preferably in the range of 1 to 5. One to three hydrolyzable groups or hydroxy groups can be bonded to one silicon atom, and the number of groups is preferably two or three in terms of curability. In the case that two or more hydrolyzable groups or hydroxy groups are bonded to a silicon atom, those groups may be the same as or different from each other. A reactive silyl group containing three hydroxy groups or hydrolyzable groups on a silicon atom is preferable in terms of obtaining high activity and good curability, and excellence in the restorability, durability, and creep resistance of the cured product to be obtained. On the other hand, a reactive silyl group containing two hydroxy groups or hydrolyzable groups on a silicon atom is preferable in terms of excellent storage stability, and high elongation and high strength of the cured product to be obtained.

Exemplary terminal groups include a trimethoxysilyl group, a triethoxysilyl group, a triisopropoxysilyl group, a dimethoxymethylsilyl group, a diethoxymethylsilyl group, a diisopropoxymethylsilyl group, an α-chloromethyldimethoxysilyl group, and an α-chloromethyldiethoxysilyl group.

In terms of the activity, an α-chloromethyldimethoxysilyl group, an α-chloromethyldiethoxysilyl group, a trimethoxysilyl group, a triethoxysilyl group, and a dimethoxymethylsilyl group are more preferable, and a trimethoxysilyl group is particularly preferable because a curable composition having high activity and good curability can be obtained. In terms of storage stability, a dimethoxymethylsilyl group is particularly preferable. In terms of environmental suitability, a triethoxysilyl group and a diethoxymethylsilyl group are particularly preferable because an alcohol produced by hydrolysis reaction of the reactive silyl groups is ethanol and thus has higher safety.

Use of a silyl terminated polymer having a terminal group of an α-chloromethyldimethoxysilyl group, an α-chloromethyldiethoxysilyl group, or a trimethoxysilyl group, or a combination use of a first silyl terminated polymer having a terminal group of an α-chloromethyldimethoxysilyl group, an α-chloromethyldiethoxysilyl group, or a trimethoxysilyl group with a second silyl terminated polymer having a terminal group of a dimethoxymethylsilyl group can enable a curable composition having a high curing rate. Alternatively, introducing both of the groups into a single silyl terminated polymer can also enable a curable composition having a high curing rate. Use amount of a highly reactive organic polymer such as an organic polymer containing an α-chloromethyldimethoxysilyl group, an α-chloromethyldiethoxysilyl group, or a trimethoxysilyl group, and the ratio of the both groups in one organic polymer are appropriately determined such that a desired elongation at break of the cured product and a desired curing rate can be obtained.

Introduction of the terminal group to a polyether chain to form the silyl terminated polymer can be performed by a known method. For example, the polyether chain can contain a terminal functional group such as a hydroxy group, unsaturated group (e.g., vinyl group), epoxy group or isocyanato group that can react with a compound containing a reactive silyl group to form the silyl terminated polymer. Exemplary methods for attaching a silyl terminal group to a polyether chain are disclosed in JP-B S45-36319, JP-B 546-12154, JP-A S50-156599, JP-A S54-6096, JP-A S55-13767, JP-A S55-13468, JP-A S57-164123, JP-B H3-2450, U.S. Pat. No. 3,632,557, U.S. Pat. No. 4,345,053, U.S. Pat. No. 4,366,307, U.S. Pat. No. 4,960,844, JP-A S61-197631, JP-A S61-215622, JP-A S61-215623, JP-A S61-218632, JP-A H3-72527, JP-A H3-47825, and JP-A H8-231707.

A minimum amount of the molecular weight of the silyl terminated polymer is preferably about 2,000 g/mol, more preferably about 5,000 g/mol, and still more preferably about 10,000. A maximum amount thereof is preferably about 50,000 g/mol, more preferably about 30,000, and still more preferably about 25,000 g/mol. If the molecular weight is less than about 2,000 g/mol, the elongation at break of the cured product to be obtained from the reactive silyl group-containing organic polymer tends to decrease. If the molecular weight is more than about 50,000 g/mol, the concentration of the cross-linkable functional group (reactive silyl group concentration) is so low that the curing rate tends to decrease; also in this case, the viscosity of the silyl terminated polymer can be so high that the handleability tends to decrease.

The molecular weight of the silyl terminated polymer can be defined as the molecular weight (terminal group-based molecular weight) corresponding to the number average molecular weight determined by directly measuring the terminal group concentration of the organic polymer precursor (e.g., 5 hydroxy group-terminated polyoxyalkylene polymer) before the reactive silyl group introduction by titrimetric analysis based on the principles of the method of measuring the hydroxyl value according to JIS K 1557 and the method of measuring the iodine value according to JIS K 0070, followed by determination in consideration of the structure (branching degree determined based on the polymerization initiator used) of the polyether moiety. The method of measuring the molecular weight of the polyether moiety may alternatively be performed by preparing a calibration curve of the polystyrene-equivalent number average molecular weight (GPC molecular weight) obtained by general GPC measurement of the organic polymer precursor and the above-defined terminal group-based molecular weight, and then converting the GPC molecular weight of the polyether moiety into a terminal group-based molecular weight. Other embodiments of silyl terminated polymers that can be used in the present invention include those found in Patent Cooperation Treaty Application, PCT/JP 2011/077273, assigned to Kaneka Corporation, which is incorporated herein by reference.

The composition can include a single silyl terminated polymer, or a mixture of silyl terminated polymers. For example, a mixture of silyl terminated polymers can be used to tailor the properties of the composition, such as viscosity and the like, for a specific application, such as an adhesive, sealant or coating. In some embodiments, a mixture can include a linear silyl terminated polymer and a branched silyl terminated polymer. A weight percentage of silyl terminated polymer in a composition may range between about 10 to about 60% based on the total weight of the composition. In some embodiments, the silyl terminated polymer may range in weight percentage from about 15 to about 50 wt % of the total composition. In some embodiments, wherein a mixture of two silyl terminated polymers is used in a composition, a weight ratio of the two polymers in the mixture can range from about 10 to about 60 wt %. One of ordinary skill in the art will recognize that a mixture can include any suitable number of silyl terminated polymers necessary to tailor the properties of the desired application.

Exemplary silyl terminated polymers can include those available from Kaneka Corporation, such as MS Polymer™ S203H, S303H, and SAX400. In some embodiments, these exemplary silyl terminated polymers can be represented by Formula 3:

Formula 3

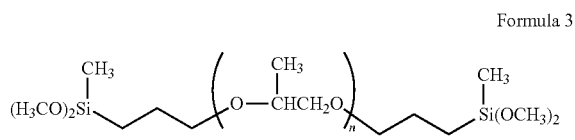

Formula 3 can represent linear or branched polyoxypropylene dimethoxymethylsilane polymers. The molecular weight of Formula 3 can range from about 2,000 to about 50,000. Viscosity of Formula 3 can range from about 8 to about 24 cps×$10^3$ at about 73° F.

As used herein, the term "polyether carbonate polyol" means a linear or branched polymer having more than one monomer unit. The monomer units can include polyether, e.g., —($R_1$O)—, where $R_1$ is a linear or branched alkyl group, and carbonate, e.g., —($R_2$—O(C=O)O)—, where $R_2$ is a linear or branched alkyl group. The polyether carbonate polyol can have more than one hydroxyl group, e.g., —OH, wherein the hydroxyl group is located at a terminal end or along the backbone of the polymer. The polyether carbonate polyol can be a copolymer having block, random or alternating configurations. The polyether carbonate polyols can be diols, e.g., a linear polyether carbonate polyol, triols or higher numbers of hydroxyl groups based on a number of branches and/or identity of terminal groups in the polyether carbonate polyol. As discussed herein, inclusion of another monomer unit, such as polyether, into a carbonate polyol can result in improved properties of a composition that includes a silyl terminated polymer.

The polyether monomer unit of the polyether carbonate polyol, —($R_1$O)—, where $R_1$ is a linear or branched alkyl group, can have any number of variants that will be apparent to one of ordinary skill in the art. Exemplary polymers than can comprise blocks of the polyether carbonate polyol can include polyoxyethylene polymers, polyoxypropylene polymers, polyoxybutylene polymers, among other polymers. Exemplary $R_1$ in the monomer unit, —($R_1$O)—, can be linear or branched alkyl groups, for example, include —$CH_2$—, —$CH_2CH_2$—, —$CH_2CH(CH_3)$—, —$CH_2CH(CH_2CH_3)$—, —$CH(CH_3)CH(CH_3)$—, —$CH_2CH_2CH_2CH_2$—; halogen-containing groups, for example, —$CH_2CH(CH_2Cl)$; and/or aromatic groups, for example, —$CH_2CH(C_6H_5)$—.

The carbonate monomer unit of the polyether carbonate polyol, —($R_2$—O—(C=O)O)—, where $R_2$ is a linear or branched alkyl group, can have any number of variants that will be apparent to one of ordinary skill in the art. Exemplary polymers than can comprise blocks of the polyether carbonate polyol can include polycarbonate, e.g., where $R_2$ is absent, polymethylene carbonate, polyethylene carbonate, polypropylene carbonate, polybutylene carbonate, linear or branched variations thereof, among other polymers. Exemplary $R_2$ in the monomer unit, —($R_2$—O(C=O)O)—, can be linear or branched alkyl groups, for example, include —$CH_2$—, —$CH_2CH_2$—, —$CH_2CH(CH_3)$—, —$CH_2CH(CH_2CH_3)$—, —$CH(CH_3)CH(CH_3)$—, —$CH_2CH_2CH_2CH_2$—; halogen-containing groups, for example, —$CH_2CH(CH_2Cl)$; and/or aromatic groups, for example, —$CH_2CH(C_6H_5)$—, or $R_2$ can be absent.

In an alternating configuration of the polyether carbonate polyol, a monomer unit, such as ($R_3$—O—(C=O)O)—, having both an ether group and a carbonate group can be present. Variations of $R_3$ may be similar to those of $R_1$ discussed above for an ether monomer unit. One of ordinary skill in the art will appreciate that other variations of the monomer unit having both an ether group and a carbonate group in an alternating configuration are possible.

The composition can include a single polyether carbonate polyol, or a mixture of polyether carbonate polyols. For example, a mixture of polyether carbonate polyols can be used to tailor the properties of the composition, such as viscosity, tensile strength, curing rate, and the like, for a specific application, such as an adhesive, sealant or coating. A mixture can include any suitable combination of polyether carbonate polyols necessary to achieve the desired property. In some embodiments, a mixture can include a linear polyether carbonate polyol and a branched polyether carbonate polyol.

The polyether carbonate polyol can range in molecular weight. In some embodiments, the molecular weight can be up to about 5000 g/mol. In some embodiments, the molecular weight of a polyether carbonate polyol may be about 1000 to about 2000 g/mol.

A weight percentage of polyether carbonate polyol in a composition may range between about 2.5 to about 40% based on the total weight of the composition. In some embodiments, the polyether carbonate polyol may range in weight percentage from about 2.5 to about 20 wt % of the total composition.

In some embodiments, wherein a mixture of two polyether carbonate polyols is used in a composition, a weight ratio of the two polymers in the mixture can range from about 2.5 to about 40 wt % of the mixture. One of ordinary skill in the art will recognize that a mixture can include any suitable number of silyl terminated polymers necessary to tailor the properties of the desired application.

Exemplary polyether carbonate polyols can include those available from Novomer, Inc. of Waltham, Mass., USA, such as Novomer Converge® 212-10 and 212-20. Other embodiments of polyether carbonate polyols that can be used in the present invention include those found in U.S. Pat. Nos. 8,247,520, and 8,580,911, assigned to Novomer, Inc., which are incorporated herein by reference. In some embodiments, these polyether carbonate polyols can be a polypropylene carbonate polyol represented by Formula 4:

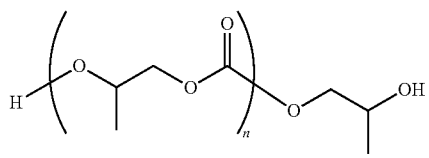

Formula 4

The molecular weight of Formula 4 can range from about 1000 to about 2000 grams/mol.

The polyether carbonate polyol can be a single polyether carbonate polyol or more than one polyether carbonate polyol, such as a mixture of polyether carbonate polyols. For example, the polyether carbonate polyols of the mixture may have different molecular weights, or chemical compositions. One of ordinary skill in the art will appreciate that the polyether carbonate polyol can be tailored, for example by mixing different polyether carbonate polyols together, or by changing the amounts of polyether and carbonate in the polymer backbone, to achieve a desired performance characteristic of the composition.

The polyether carbonate polyol may be added in an amount sufficient to improve desired properties. In some embodiments, the amount may be sufficiently small so as to improve properties yet minimize increased production costs of the composition. A weight percentage of polyether carbonate polyol may range between about 1 to about 5% based on the total weight of the composition. In some embodiments, the weight percentage of polyether carbonate polyol can range from about 5 to about 10%. The polyether carbonate polymer can, when activated, cross link with the silyl terminated polymer to form a cured composition. The weight ratio of the polyether carbonate polymer to the silyl terminated polymer can vary, and may depend on a particular application to which the composition is being applied. A weight ratio of the polyether carbonate polyol to the silyl terminated polymer can range from about 1:20 to about 1:1. In some embodiments, the weight ratio may range from about 1:5 to about 4:5.

The composition can be tailored for various applications, such as cosmetics, sealants, coatings, adhesives. The composition can include one or more additional components, for example, that may tailor the properties of the composition to a particular application. Additional components can include plasticizers, antioxidants, rheological modifiers, ultraviolet (UV) absorbers, hindered amine light stabilizers (HALS), dehydration agents, adhesion promoters, catalysts, and organic and/or inorganic mineral fillers, recycled and/or non recycled These components are by no means an exhaustive list, and one of ordinary skill in the art will recognize that other components can be used. One of ordinary skill in the art will recognize that at least some of these components are optional, and their inclusion will depend on a particular application.

The "plasticizer" herein is defined as a compound that has a vapor pressure at 20° C. of lower than 0.01 kPa, and is not reactive with the silyl terminated polymer and the polyether carbonate polyol. Addition of the plasticizer enables to adjust the mechanical properties such as the viscosity and slump properties of the curable composition, and the tensile strength and elongation of the coating film obtainable by curing the composition. Examples of the plasticizer include phthalate esters such as diisonnyl phthalate (DINP), dibutyl phthalate, diheptyl phthalate, di(2-ethylhexyl) phthalate, and butyl benzyl phthalate; esters of non-aromatic dibasis acids such as dioctyl adipate, dioctyl sebacate, dibutyl sebacate, and isodecyl succinate; aliphatic esters such as butyl oleate and methyl acetylricinoleate; phosphate esters such as tricresyl phosphate and tributyl phosphate; trimellitate esters; chlorinated paraffins; hydrocarbon oils such as alkyldiphenyls and partially hydrogenated terphenyls; process oils; and epoxy plasticizers such as epoxidized soybean oil and benzyl epoxystearate.

Also, polymer plasticizers can be used. In the case of using a polymer plasticizer, the initial physical properties can be maintained for a long period of time compared to the case of using a low-molecular weight plasticizer. The drying properties (also referred to as coating properties) of an alkyd coating material applied to the coating film can also be improved. Specific examples of the polymer plasticizer include polyoxyalkylene polymers containing no reactive silyl group, which can be obtained by polymerization of a single or multiple compounds such as aliphatic alkylene oxides (e.g., ethylene oxide, propylene oxide, 1,2-butylene oxide, 2,3-butylene oxide, epichlorohydrin, tetramethylene oxide) and aromatic alkylene oxides (e.g., styrene oxide) by any of the above methods (e.g., polymerization method using an alkali catalyst such as KOH; polymerization method using a catalyst of a transition metal compound-porphyrin complex such as a complex obtainable by reacting an organoaluminum compound and porphyrin; polymerization method using a double metal cyanide complex catalyst; polymerization method using a catalyst containing a polyphosphazene salt; and polymerization method using a catalyst containing a phosphazene compound); vinyl polymers obtained by polymerizing vinyl monomers by various methods; esters of polyalkylene glycols, such as diethylene glycol dibenzoate, triethylene glycol dibenzoate, and pentaerythritol ester; polyester plasticizers obtainable from dibasic acids (e.g., sebacic acid, adipic acid, azelaic acid, phthalic acid) and divalent alcohols (e.g., ethylene glycol, diethylene glycol, triethylene glycol, propylene glycol, dipropylene glycol); polystyrenes such as polystyrene and poly-a-rnethylstyrene; polybutadiene, polybutene, polyisobutylene, polybutadieneacrylonitrile, and polychloroprene.

The molecular weight of the polymer plasticizer is preferably 500 to 15,000, more preferably 800 to 10,000, still more preferably 1,000 to 8,000, particularly preferably 1,000 to 5,000, and most preferably 1,000 to 3,000. If the molecular weight is too low, the plasticizer exudes due to heat or rain over time, and therefore the initial physical properties cannot be maintained for a long period of time and the alkyd coating properties cannot be improved. If the molecular weight is too high, the viscosity becomes high and the workability is deteriorated.

The molecular weight distribution of the polymer plasticizer is not particularly limited but is preferably narrow; the molecular weight distribution is preferably less than 1.8, more preferably not more than 1.7, still more preferably not more than 1.6, even more preferably not more than 1.5, particularly preferably not more than 1.4, and most preferably not more than 1.3. In the case of a vinyl polymer, the molecular weight and the molecular weight distribution (Mw/Mn) are measured by the GPC method (polystyrene equivalent).

One plasticizer may be used alone, or two or more plasticizers may be used in combination. Also, a low molecular weight plasticizer and a polymer plasticizer may be used in combination. The amount of plasticizer may range from about 5 to about 35% based on the total weight of the composition. In some embodiments, for example, in an adhesive composition, the amount may range from about 10 to about 20% of the total adhesive composition.

The composition may contain an antioxidant (age resistor). Use of the antioxidant can enable, for example, increased weather resistance of a cured product. Exemplary antioxidants include hindered phenol antioxidants, monophenol antioxidants, bisphenol antioxidants, and polyphenol antioxidants. Hindered amine light stabilizers (HALS) can be also be used. Exemplary HALS can include Tinuvin® 622LD and Tinuvin® 144, and Tinuvin® 770; CHIMASSORB 944LD, CHIMASSORB 119FL (all are products of Ciba Japan K.K.); Adekastab LA-57, Adekastab LA-62, Adekastab LA-67, Adekastab LA-63, and Adekastab LA-68 (all are products of ADEKA Corporation); and SANOL LS-770, SANOL LS-765, SANOL LS-292, SANOL LS-2626, SANOL LS-1114, and SANOL LS-744 (all are products of Sankyo Lifetech Co., Ltd.). Exemplary antioxidant include ones disclosed in JP-A H4-283259 and JP-A H9-194731.

The amount of antioxidant may range from about 0.05 to about 1.5% based on the total weight of the composition. In some embodiments, for example, in an adhesive composition, the amount may range from about 0.1 to about 0.5% of the total adhesive composition.

The composition may include an ultraviolet absorber. Use of the ultraviolet absorber can enable, for example, increased surface weather resistance of the cured composition. Exemplary ultraviolet (UV) absorbers include benzophenone compounds, benzotriazole compounds, such as hydroxyphenyl benzotriazole and Tinuvin® 326, salicylate compounds, substituted tolyl compounds, and metal chelate compounds.

The amount of UV absorber may range from about 0.05 to about 1.50% based on the total weight of the composition. In some embodiments, for example, in an adhesive composition, the amount may range from about 0.1 to about 0.5% of the total adhesive composition.

Depending on how a composition is packaged, the composition may include a dehydration agent. For example, in a one-pack type curable composition, all components may be mixed together and included in a single package. Therefore, components containing water may be dehydrated and dried prior to application or dehydrated, for example, under reduced pressure during the mixing and kneading. For example, in a two-pack type curable composition, where curable components are separated, a small amount of water can be tolerated. However, for long-term storage stability, the components components are preferably dehydrated and dried in a two-ack type curable composition.

Exemplary dehydrating and drying method include: heat drying in the case that the components are solids such as powder; and vacuum dehydration and dehydration using a substance such as synthetic zeolite, active alumina, silica gel, quick lime, and magnesium oxide in the case that the components are liquids. Alternatively, or in combination after dehydration and drying, the composition may be mixed with a small amount of an isocyanato compound such that an isocyanato group and water are reacted for dehydration. Yet alternatively, the composition may be mixed with an oxazolidine compound such as 3-ethyl-2-methyl-2-(3-methylbutyl)-1,3-oxazolidine so that the compound is reacted with water for dehydration. The storage stability can be further improved by, in addition to performing the dehydration and drying method, adding an lower alcohol such as methanol and ethanol; or an alkoxysilane compound such as n-propyltrimethoxysilane, vinyltrimethoxysilane, such as Dynasylan® VTMO, vinylmethyldimethoxysilane, methyl silicate, ethyl silicate, γ-mercaptopropylmethyldimethoxysilane, γ-mercaptopropylmethyldiethoxysilane, and γ-glycidoxypropyltrimethoxysilane.

The amount of dehydration agent may range from about 0.2 to about 3.0% based on the total weight of the composition. In some embodiments, for example, in an adhesive composition, the amount may range from about 0.5 to about 1.0% of the total adhesive composition.

The composition can include inorganic fillers or mineral fillers. Exemplary fillers can include calcium carbonate, such as Ultra-PFlex®, Hubercarb® Q3T, G2T, G35, G8, Gama-Sperse®, and CalWhite®.

The amount of calcium carbonate may range from about 30 to about 70% based on the total weight of the composition. In some embodiments, for example, in an adhesive composition, the amount may range from about 30 to about 70% of the total adhesive composition.

The composition can include titanium oxide. Exemplary titanium oxide includes Ti-Pure® R-902+, R-706, R-900, R-931, and TS-6200.

The amount of titanium oxide may range from about 1 to about 20% based on the total weight of the composition. In some embodiments, for example, in an adhesive composition, the amount may range from about 3 to about 10% of the total adhesive composition.

The composition can include rheology modifiers. Exemplary rheology modifiers include Crayvallac® SL, SLX, SLT, fumed silica, or a liquid thixotrope, such as Thixcin® R.

The amount of rheological modifiers may range from about 0.1 to about 3.0% based on the total weight of the composition. In some embodiments, for example, in an adhesive composition, the amount may range from about 0.1 to about 0.6% of the total adhesive composition.

The composition can include adhesion promoters. Exemplary adhesion promoters include functionalized organosilanes, such as Dynasylan® DAMO-T, AMMO, GLYMO, or GLYEO The amount of adhesion promoter may range from about 0.2 to about 3.0% based on the total weight of the composition. In some embodiments, for example, in an adhesive composition, the amount may range from about 0.2 to about 3.0% of the total adhesive composition.

The composition can include catalyst. Exemplary catalysts include dibutyltin diacetylacetonate, such as Neostann U-220H, REAXIS® C226, or TIB KAT® 226.

The amount of catalyst may range from about 0.2 to about 3.0% based on the total weight of the composition. In some embodiments, for example, in an adhesive composition, the amount may range from about 0.3 to about 1.5% of the total adhesive composition.

In application, the composition can be cured through a moisture activation process. For example, once the composition is exposed to atmospheric conditions, a polycondensation reaction can occur between the silyl terminated polymer and the polypropylene carbonate polyol to covalent bond these polymers. The polcondensation reaction can be initiated by the catalyst. In some embodiments, a byproduct of the polycondensation reaction can be an alcohol, such as methanol.

EXAMPLES

Examples 1-8 describe compositions made using a mixture of a silyl terminated polyether and a polypropylene carbonate polyol. Comparative Examples 1-4 describe compositions made using a silyl terminated polyether (Comp Ex 1) or using a mixture of silyl terminated polyether and polycarbonate polyol (Comp Ex 2-4). The identity of remaining components of the compositions in the Examples and Comparative Examples, such as plasticizers, adhesion promoters, and the like, are the same. The identity and amounts of each component used in the Examples and Comparative Examples are shown in Table 1.

g of a rheology modifier (Crayvallac SL), about 1 g of a ultraviolet absorber (tinuvin 326), and about 1 g of a hindered amine light stabilizer (HALS, tinuvin 770). The preceding mixture is heated between about 100 to 110° C. for about 1 to about 2 hours under vacuum. The mixture is cooled to about 40° C. or less, and then about 3 g of a dehydration agent (VTMO), about 3 g of an adhesion promoter (DAMO-T), and about 2 g of a catalyst (U-220H) is added.

Silyl-terminated polymer 1 can be prepared by the following method. Propylene oxide was polymerized using a 1/1 (in weight ratio) mixture of polyoxypropylene diol with a number average molecular weight of about 3,000 g/mol and polyoxypropylenetriol with a number average molecular weight of about 3,000 g/mol as an initiator in the presence of a zinc hexacyanocobaltate glyme complex catalyst to give hydroxyl-terminated polypropylene oxide having a number average molecular weight of about 19,700 g/mol (polystyrene-equivalent value measured by using a TOSOH model HLC-8120 GPC solvent delivery system, a TOSOH model TSK-GEL H type column, with tetrahydrofuran (THF) as a solvent). Thereto was added a methanol solution of sodium

TABLE 1

| Component grams (g)/ (weight percent) | Examples | | Comparative Examples | | | |
|---|---|---|---|---|---|---|
| | 1 | 2 | 1 | 2 | 3 | 4 |
| polyoxypropylene dimethoxymethylsilane | 100 (23.0%) | 100 (23.0%) | 100 (22.9%) | 100 (23.0%) | 100 (23.0%) | 100 (23.0%) |
| Polypropylene carbonate polyol | 21.7 (5.0%) | 21.7 (5.0%) | — | — | — | — |
| Polycarbonate polyol | — | — | — | 21.7 (5.0%) | 21.7 (5.0%) | 21.7 (5.0%) |
| Plasticizer | 68.3 | 68.3 | 90 | 68.3 | 68.3 | 68.3 |
| Calcium Carbonate | 214 | 214 | 214 | 214 | 214 | 214 |
| Titanium Oxide | 20 | 20 | 20 | 20 | 20 | 20 |
| Rheology modifier | 0.5 | 0.5 | 2 | 0.5 | 0.5 | 0.5 |
| UVA | 1 | 1 | 1 | 1 | 1 | 1 |
| HALS | 1 | 1 | 1 | 1 | 1 | 1 |
| Dehydration Agent | 3 | 3 | 3 | 3 | 3 | 3 |
| Adhesion Promoter | 3 | 3 | 3 | 3 | 3 | 3 |
| Catalyst | 2 | 2 | 2 | 2 | 2 | 2 |

| Component Grams (g)/ (weight percent) | Examples | | | | | |
|---|---|---|---|---|---|---|
| | 3 | 4 | 5 | 6 | 7 | 8 |
| polyoxypropylene dimethoxymethylsilane | 100 (23.0%) | 100 (23.0%) | 100 (23.0%) | 100 (23.0%) | 100 (23.0%) | 100 (23.0%) |
| Polypropylene carbonate polyol | 43.5 (10.0%) | 43.5 (10.0%) | 43.5 (10.0%) | 43.5 (10.0%) | 43.5 (10.0%) | 43.5 (10.0%) |
| Plasticizer | 46.5 | 46.5 | 46.5 | 46.5 | 46.5 | 46.5 |
| Calcium Carbonate | 214 | 214 | 214 | 214 | 214 | 214 |
| Titanium Oxide | 20 | 20 | 20 | 20 | 20 | 20 |
| UVA | 1 | 1 | 1 | 1 | 1 | 1 |
| HALS | 1 | 1 | 1 | 1 | 1 | 1 |
| Dehydration Agent | 3 | 3 | 3 | 3 | 3 | 3 |
| Adhesion Promoter | 3 | 3 | 3 | 3 | 3 | 3 |
| Catalyst | 2 | 2 | 2 | 2 | 2 | 2 |

Example 1

About 100 grams (g) of polyoxypropylene dimethoxymethylsilane (70 wt % silyl-terminated polymer 1/30 wt % silyl-terminated polymer 2) is mixed with about 21.7 g of a polypropylene carbonate polyol (Novomer 212-10). To this mixture is added about 68.3 g of a plasticizer (DINP), about 214 g of a calcium carbonate (160 g UltraPflex, 54 g Q3T), about 20 g of a titanium oxide (Ti-Pure R902+), about 0.5 methoxide in an amount of about 1.2 equivalents relative to the hydroxyl groups of the hydroxyl-terminated polypropylene oxide and then methanol was distilled off from the methanol solution. Allyl chloride was then added to the residue of the solution for conversion of each terminal hydroxyl group to an allyl group, and allyl-terminated polypropylene was obtained.

The obtained allyl polymer (about 100 parts by weight) was reacted with about 1.34 parts by weight of methyldimethoxysilane at 90° C. for 2 hours in the presence of about 36 ppm of an isopropanol solution of a platinum-vinylsiloxane complex (platinum content: about 3% by weight) as a catalyst to give a methyldimethoxysilyl-terminated polypropylene oxide with a number average molecular weight of about 19,700 g/mol. As a result of H-NMR measurement (made in chloroform-D ($CDCl_3$) solvent using a Nippon Denshi (JEOL Ltd., model JNM-LA400), the average number of terminal methyldimethoxysilyl groups per molecule was found to be about 1.7.

Silyl-terminated polymer 2 can be prepared by the following method. Propylene oxide was polymerized using polyoxypropylene diol with a number average molecular weight of about 3,000 g/mol as an initiator in the presence of a zinc hexacyanocobaltate glyme complex catalyst to give hydroxyl-terminated polypropylene oxide having a number average molecular weight of about 16,200 g/mol (polystyrene-equivalent value measured by using a TOSOH model HLC-8120 GPC solvent delivery system, a TOSOH model TSK-GEL H type column, with THF as a solvent). Thereto was added a methanol solution of sodium methoxide in an amount of about 1.2 equivalents relative to the hydroxyl groups of the hydroxyl-terminated polypropylene oxide and then methanol was distilled off from the methanol solution. Allyl chloride was then added to the residue of the solution for conversion of each terminal hydroxyl group to an allyl group, and allyl-terminated polypropylene was obtained.

The obtained allyl polymer (about 100 parts by weight) was reacted with about 1.30 parts by weight of methyldimethoxysilane at 90° C. for 2 hours in the presence of about 36 ppm of an isopropanol solution of a platinum-vinylsiloxane complex (platinum content: about 3% by weight) as a catalyst to give a methyldimethoxysilyl-terminated polypropylene oxide with a number average molecular weight of about 16,200 g/mol. As a result of H-NMR measurement (made in CDCl3 solvent using a Nippon Denshi (JEOL Ltd., model JNM-LA400), the average number of terminal methyldimethoxysilyl groups per molecule was found to be about 1.2.

Example 2

The composition of Example 2 was obtained in the same manner as that of Example 1, except the polypropylene carbonate polyol was replaced with Novomer 212-20.

Example 3

The composition of Example 3 was obtained in the same manner as that of Example 1, except the amount of plasticizer is 46.5 g and the amount of polypropylene carbonate polyol is 43.5 g, and rheology modifier is not added. The weight percentage of polypropylene carbonate polyol in Example 6 is 10 wt %.

Example 4

The composition of Example 4 was obtained in the same manner as that of Example 3, except the silyl terminated polyether was replaced with a high strength grade polyoxypropylene dimethoxymethylsilane (70 wt % silyl-terminated polymer 3/30 wt % silyl-terminated polymer 4).

Silyl-terminated polymer 3 can be prepared by the following method. Propylene oxide was polymerized using polyoxypropylene diol with a number average molecular weight of about 2,000 as an initiator in the presence of a zinc hexacyanocobaltate glyme complex catalyst to give hydroxyl-terminated polypropylene oxide having a number average molecular weight of about 28,500 (polystyrene-equivalent value measured by using a TOSOH model HLC-8120 GPC solvent delivery system, a TOSOH model TSK-GEL H type column, with THF as a solvent). Thereto was added a methanol solution of sodium methoxide in an amount of about 1.0 equivalent relative to the hydroxyl groups of the hydroxyl-terminated polypropylene oxide and then methanol was distilled off from the methanol solution. Then allyl glycidyl ether in an amount of about 1.0 equivalent relative to the hydroxyl groups of the hydroxyl-terminated polypropylene oxide was added to the residue of the solution and the reaction was carried out at 130° C. for about 2 hours. Thereto was added a methanol solution of NaOMe in an amount of about 0.28 equivalents relative to the hydroxyl groups of the hydroxyl-terminated polypropylene oxide and then methanol was distilled off from the methanol solution. Allyl chloride was then added to the residue of the solution for conversion of each terminal hydroxyl group to an allyl group, and allyl-terminated with a number average molecular weight of about 28,500 was obtained.

The obtained allyl polymer (100 parts by weight) was reacted with about 1.92 parts by weight of methyldimethoxysilane at 90° C. for 2 hours in the presence of an isopropanol solution of a platinum-vinylsiloxane complex as a catalyst to give a methyldimethoxysilyl-terminated polypropylene oxide with a number average molecular weight of about 28,500. As a result of H-NMR measurement (made in $CDCl_3$ solvent using a Nippon Denshi (JEOL Ltd., model JNM-LA400), the average number of terminal methyldimethoxysilyl groups per molecule was found to be about 3.4.

Silyl-terminated polymer 4 can be prepared by the following method. Propylene oxide was polymerized using polyoxypropylene triol with a number average molecular weight of about 3,000 as an initiator in the presence of a zinc hexacyanocobaltate glyme complex catalyst to give hydroxyl-terminated polypropylene oxide having a number average molecular weight of about 26,200 (polystyrene-equivalent value measured by using a TOSOH model HLC-8120 GPC solvent delivery system, a TOSOH model TSK-GEL H type column, with THF as a solvent). Thereto was added a methanol solution of sodium methoxide in an amount of about 1.2 equivalents relative to the hydroxyl groups of the hydroxyl-terminated polypropylene oxide and then methanol was distilled off from the methanol solution. Allyl chloride was then added to the residue of the solution for conversion of each terminal hydroxyl group to an allyl group, and allyl-terminated polypropylene was obtained.

The obtained allyl polymer (100 parts by weight) was reacted with about 1.30 parts by weight of methyldimethoxysilane at 90° C. for 2 hours in the presence of about 36 ppm of an isopropanol solution of a platinum-vinylsiloxane complex (platinum content: about 3% by weight) as a catalyst to give a methyldimethoxysilyl-terminated polypropylene oxide with a number average molecular weight of about 26,200. As a result of H-NMR measurement (made in $CDCl_3$ solvent using a Nippon Denshi (JEOL Ltd., model JNM-LA400), the average number of terminal methyldimethoxysilyl groups per molecule was found to be about 2.3.

Example 5

The composition of Example 5 was obtained in the same manner as that of Example 4, except the amount of calcium carbonate was changed to 185 g Ultra-PFlex® and 29 g Hubercarb® Q3T.

Example 6

The composition of Example 6 was obtained in the same manner as that of Example 4, except the amount of the high strength grade polyoxypropylene dimethoxymethylsilane is changed to 50 wt % silyl-terminated polymer 3/50 wt % silyl-terminated polymer 4.

Example 7

The composition of Example 7 was obtained in the same manner as that of Example 6, except the amount of calcium carbonate was changed to 185 g Ultra-PFlex® and 29 g Hubercarb® Q3T.

Example 8

The composition of Example 8 was obtained in the same manner as that of Example 6, except the amount of calcium carbonate was changed to 214 g Ultra-Pflex® and 0 g Hubercarb® Q3T.

Comparative Example 1

The composition of Comparative Example 1 was obtained in the same manner as that of Example 1, except the polypropylene carbonate polyol is omitted, the amount of plasticizer is 90 g, and the amount of rheology modifier is 2 g.

Comparative Examples 2-4 use polycarbonate polyols having monomer units made from 3-methyl-1,5-pentanediol (MPD), 1,6-hexanediol (HD), and diethyl carbonate (DEC), available from Kuraray, Inc. of Japan. Properties of these polycarbonate polyols are listed in Table 2.

TABLE 2

| Polymer | Molecular Weight (Mw) | OH value |
|---|---|---|
| Kuraray C-590 | 500 | 224 |
| Kuraray C-1090 | 1000 | 112 |
| Kuraray C-2090 | 2000 | 56 |

Comparative Example 2

The composition of Comparative Example 2 was obtained in the same manner as that of Example 1, except the polypropylene carbonate polyol of Example 1 is replaced by Kuraray C-590.

Comparative Example 3

The composition of Comparative Example 3 was obtained in the same manner as that of Example 1, except the polypropylene carbonate polyol of Example 1 is replaced by Kuraray C-1090.

Comparative Example 4

The composition of Comparative Example 4 was obtained in the same manner as that of Example 1, except the polypropylene carbonate polyol of Example 1 is replaced by Kuraray C-2090.

Measurements

Measurements were performed on Examples 1-8 and Comparative Examples 1-4. The results of these measurements are summarized in Tables 5-8, and discussed below.

The measurements are performed twice on each composition, once within about 5 to about 7 days, and a second time after storage at about 50 degrees Celsius for about 4 weeks. Generally, minimal change between the first and second measurements of each composition indicates good shelf stability.

Viscosity

A Brookfield viscometer is used to measure viscosity, with the use of spindle #7 at temperature of about 23±2° C. and humidity of about 50±5%. A composition will be tested at least about 5 days after manufactured. Viscosity measurement starts with low speed at 1 rpm, and then 2 rpm and last at 10 rpm.

Skin Formation Time

A composition is applied to a flat surface in a bead shape using a caulking gun or other application instrument. The bead is flattened to a height of about 5 mm. A spatula is gently contacted to the surface of the bead until no material from the composition is transferred onto the spatula.

Cure in Depth

Three polypropylene tubes (14 mL round bottom tube, ¾ inch diameter) are identically filled with a composition. The tubes are stored at about 23 degrees Celsius and about 50% relative humidity for 1, 3 and 7 days, respectively. The composition is removed from each tube and a depth to which the composition has cured is measured.

Residual Tack

Residual tack will be measured at least about 5 days after a composition is manufactured. A bead of the composition is applied onto cardboard at thickness of about 5 millimeters (mm) and width of about 5 mm. The bead is cured in a temperature and humidity controlled environment at 23±2° C. and humidity at 50±5%. Tack was measured after 1, 3 and 7 days of curing at rating from 1-8. 1 being poor with very high tack, and 8 being the least tack.

Hardness

Hardness is measured in accordance with ASTM C661 testing protocols. A composition is cast in a mold at about 6 mm height. The composition is cured by moisture in a temperature and humidity environment of 23±2° C. and 50±5%, respectively, for least 2 weeks. Three cured sheets are stacked to reach total thickness of about 20 mm. A reading from a Durometer is recorded as the hardness of a cured composition.

Tensile Strength

Tensile strength is measured in accordance with ASTM D412 testing protocols, test method A. A composition is cast in a mold at about 6 mm height. The composition is cured by moisture in a temperature and humidity environment of 23±2° C. and 50±5%, respectively, for least 2 weeks. The cured composition is cut into a dumbbell shape using a dumbbell die. The dumbbell shaped cured composition is mounted to a load cell and set cross head speed 500 mm/min.

Hand-Peeling Test

Bead shapes of the composition are prepared in the same manner as described above for the skin formation time measurement on each of the testing surfaces: motar, anodized aluminum, stainless steel, glass, polyvinyl chloride (PVC), polycarbonate (PC), acrylonitrile butadiene styrene (ABS), and pine wood. The bead shapes are cured for about 7 days at about 23 degrees Celsius and about 50% relative humidity before peeling the bead shapes off the testing surfaces. When no material remains on the testing surface, the composition has an adhesive failure (AF). When material remains on the testing surface, the composition has a cohesive failure (CF). CF is desirable, and AF is not.

Weatherability Test

Weatherability testing can be performed on those instruments available from Q-LAB Corporation of Westlake, Ohio, such as the QUV accelerated weatherability tester.

TABLE 3

| Measurement | | Units | COMPARATIVE EXAMPLE 1 | |
|---|---|---|---|---|
| | | | 5-7 days | 4 weeks |
| Viscosity (LV) | 1 rpm | cP | 2,390,000 | 3,180,000 |
| | 2 rpm | | 1,310,000 | 1,720,000 |
| | 10 rpm | | 354,000 | 492,000 |
| Skin Formation Time | | min | 43 | 30 |
| Cure in depth | 1 day | mm | 2.40 | 3.10 |
| | 7 days | | 6.99 | 8.25 |
| Residual tack | 1 day | | 4 | 2 |
| | 3 days | | 5 | 4 |
| | 7 days | | 5 | 5 |
| Hardness (ASTM C661) | | shore A | 22 | 23 |
| Tensile Strength (ASTM D412) | M100 | MPa | 0.41 | 0.47 |
| | TB | | 1.40 | 1.33 |
| | EB | % | 557 | 497 |

TABLE 3-continued

| Measurement | | COMPARATIVE EXAMPLE 1 | |
|---|---|---|---|
| | | 5-7 days | 4 weeks |
| Hand peel adhesion | On Motar | AF | AF |
| | On Anodized Al | CF | CF |
| | On stainless steel | CF | CF |
| | On Glass | CF | CF |
| | On PVC | AF | AF |
| | On PC | AF | AF |
| | On ABS | CF | CF |
| | On Pine Wood | CF | CF |

Table 3 depicts the results of measurements performed on Comparative Example 1, which is a composition including only silyl terminated polymer. Comparative Example 1 generally has good stability between the first and second measurements of the composition, however, shows poor adhesion on concrete (motar), PVC, and PC. The cured composition of Comparative Example 1 fails and cracks in about 4500 to about 5500 hours during weatherability test.

TABLE 4

| Measurement | | Units | COMPARATIVE EXAMPLES | | | | | |
|---|---|---|---|---|---|---|---|---|
| | | | 2 | | 3 | | 4 | |
| | | | 5-7 days | 4 weeks | 5-7 days | 4 weeks | 5-7 days | 4 weeks |
| Viscosity (LV) | 1 rpm | cP | 4,150,000 | 3,620,000 | 4,240,000 | 4,020,000 | 4,060,000 | 3,840,000 |
| | 2 rpm | | 2,340,000 | 2,140,000 | 2,500,000 | 2,370,000 | 2,370,000 | 2,400,000 |
| | 10 rpm | | 722,000 | 700,000 | 769,000 | 692,000 | 738,000 | 848,000 |
| Skin Formation Time | | min | 60 | 120 | 60 | 120 | 60 | 120 |
| Cure in depth | 1 day | mm | 3.76 | 0 | 3.59 | 0 | 3.54 | 0 |
| | 7 days | | 9.31 | 9.62 | 8.96 | 10.38 | 8.72 | 10.70 |
| Residual tack | 1 day | | 3 | 1 | 5 | 1 | 6 | 1 |
| | 3 days | | 3 | 1 | 5 | 1 | 6 | 1 |
| | 7 days | | 6 | 1 | 6 | 1 | 7 | 2 |
| Hardness (ASTM C661) | | shore A | 22 | 11 | 28 | 13 | 26 | 13 |
| Tensile Strength (ASTM D412) | M100 | MPa | 0.42 | 0.21 | 0.50 | 0.25 | 0.55 | 0.28 |
| | TB | | 1.65 | 0.99 | 1.67 | 1.07 | 1.54 | 1.12 |
| | EB | % | 780 | 845 | 752 | 797 | 665 | 780 |
| Hand peel adhesion | On Motar | | CF | CF | CF | CF | CF | CF |
| | On Anodized Al | | CF | CF | CF | CF | AF | CF |
| | On stainless steel | | CF | CF | CF | CF | CF | CF |
| | On Glass | | CF | CF | CF | CF | CF | CF |
| | On PVC | | AF | CF | AF | CF | AF | CF |
| | On PC | | CF | CF | AF | CF | AF | CF |
| | On ABS | | CF | CF | CF | CF | CF | CF |
| | On Pine Wood | | CF | CF | CF | CF | CF | CF |

Table 4 depicts the results of measurements performed on Comparative Examples 2-4, which are compositions including a mixture of silyl terminated polymer and polycarbonate polyols. As shown in Table 4, Comparative Examples 2-4 demonstrate poor stability between first and second measurements compared with Comparative Example 1. Poor stability can be indicative of poor compatibility between poly silyl polymer and polycarbonate polyols. The cured compositions of Comparative Examples 2-4 fail and cracks in less than about 1000 hours during weatherability test.

TABLE 5

| Measurement | | Units | EXAMPLES | | | |
|---|---|---|---|---|---|---|
| | | | 1 | | 2 | |
| | | | 5-7 days | 4 weeks | 5-7 days | 4 weeks |
| Viscosity (LV) | 1 rpm | cP | 3,310,000 | 3,900,000 | 6,860,000 | 1,710,000 |
| | 2 rpm | | 1,790,000 | 2,240,000 | 3,905,000 | 1,080,000 |
| | 10 rpm | | 555,000 | 645,000 | 1,050,000 | 440,000 |
| Skin Formation Time | | min | 60 | 45 | 43 | 101 |
| Cure in depth | 1 day | mm | 3.62 | 4.2 | 2.12 | 3.58 |
| | 7 days | | 9.05 | 10.98 | 6.12 | 9.84 |
| Residual Tack | 1 day | | 7 | 6 | 8 | 5 |
| | 3 days | | 7 | 6 | 8 | 6 |
| | 7 days | | 8 | 6 | 8 | 7 |
| Hardness (ASTM C661) | | Shore A | 33 | 33 | 37 | 43 |
| Tensile | M100 | MPa | 1.25 | 0.69 | 7.16 | 0.65 |
| Strength | TB | | 2.13 | 1.91 | 1.79 | 1.55 |
| (ASTM D412) | EB | % | 680 | 668 | 646 | 565 |
| Hand peel adhesion | On Motar | | CF | CF | AF | CF |
| | On Anodized Al | | CF | CF | CF | CF |
| | On stainless steel | | CF | CF | CF | AF |
| | On Glass | | CF | CF | CF | CF |
| | On PVC | | AF | CF | CF | AF |
| | On PC | | CF | CF | CF | CF |
| | On ABS | | CF | CF | CF | CF |
| | On Pine Wood | | CF | CF | CF | CF |

Table 5 depicts the results of measurements performed on Examples 1-2, which are compositions including a mixture of silyl terminated polymer and 5 wt % polypropylene carbonate polyols. As shown in Table 5, Examples 1-2 demonstrate good stability between first and second measurements. Examples 1-2 shown improve curing, tack, hardness, modulus (M100), tensile strength (TB), elongation (EB), and adhesion on concrete (motar) and polycarbonate (PC) compared with Comparative Example 1. The cured compositions of Examples 1-2 do not show failure and cracking after about 6500 hours of weatherability test.

TABLE 6

| Measurement | | Units | EXAMPLES | | | | | |
|---|---|---|---|---|---|---|---|---|
| | | | 3 | | 4 | | 5 | |
| | | | 5-7 days | 4 weeks | 5-7 days | 4 weeks | 5-7 days | 4 weeks |
| Viscosity (LV) | 1 rpm | cP | 3,560,000 | 3,328,000 | 4,020,000 | 5,152,000 | 7,800,000 | 9,888,000 |
| | 2 rpm | | 1,920,000 | 1,744,000 | 2,310,000 | 3,152,000 | 4,080,000 | 5,792,000 |
| | 10 rpm | | 485,000 | 486,000 | 654,000 | 966,000 | 1,160,000 | 1,936,000 |
| Skin Formation Time | | min | 60 | 75 | 60 | 35 | 90 | 35 |
| Cure in depth | 1 day | mm | 2.60 | 4.35 | 2.86 | 5.77 | 3.10 | 7.15 |
| | 7 days | | 8.87 | 12.20 | 9.55 | 14.07 | 10.53 | 16.76 |
| Residual tack | 1 day | | 6 | 4 | 7 | 7 | 7 | 5 |
| | 3 days | | 6 | 4 | 7 | 6 | 7 | 6 |
| | 7 days | | 7 | 5 | 7 | 7 | 7 | 7 |
| Hardness (ASTM C661) | | Shore A | 57 | 51 | 55 | 60 | 56 | 63 |
| Tensile | M100 | MPa | 0.77 | 0.91 | 0.07 | 1.28 | 1.03 | 1.34 |
| Strength | TB | | 2.32 | 2.47 | 3.42 | 3.38 | 3.85 | 3.66 |
| (ASTM D412) | EB | % | 736 | 696 | 752 | 677 | 774 | 676 |
| Hand peel adhesion | On Motar | | AF | AF | AF | AF | AF | AF |
| | On Anodized Al | | AF | AF | AF | AF | AF | AF |
| | On stainless steel | | CF | AF | AF | AF | AF | AF |
| | On Glass | | CF | CF | CF | CF | CF | CF |
| | On PVC | | AF | AF | AF | AF | AF | AF |
| | On PC | | AF | AF | AF | AF | AF | AF |
| | On ABS | | AF | AF | AF | AF | AF | AF |
| | On Pine Wood | | CF | AF | CF | AF | AF | AF |

TABLE 6-continued

| | | | EXAMPLES | | | | |
| | | | 6 | | 7 | | 8 | |
| Measurement | | Units | 5-7 days | 4 weeks | 5-7 days | 4 weeks | 5-7 days | 4 weeks |
|---|---|---|---|---|---|---|---|---|
| Viscosity (LV) | 1 rpm | cP | 4,360,000 | 5,056,000 | 7,370,000 | 8,352,000 | 5,080,000 | 6,784,000 |
| | 2 rpm | | 2,390,000 | 2,960,000 | 4,540,000 | 4,864,000 | 2,908,000 | 3,712,000 |
| | 10 rpm | | 638,000 | 889,000 | 1,230,000 | 1,536,000 | 316,000 | 1,152,000 |
| Skin Formation Time | | min | 60 | 35 | 60 | 35 | 45 | 46 |
| Cure in depth | 1 day | mm | 3.05 | 5.36 | 3.19 | 7.35 | 4.22 | 4.35 |
| | 7 days | | 9.77 | 14.67 | 10.50 | 16.63 | 9.247 | 10.27 |
| Residual tack | 1 day | | 7 | 6 | 7 | 6 | 6 | 5 |
| | 3 days | | 7 | 6 | 7 | 6 | — | 8 |
| | 7 days | | 7 | 7 | 7 | 7 | 8 | 8 |
| Hardness (ASTM C661) | | Shore A | 56 | 59 | 52 | 62 | — | 58 |
| Tensile | M100 | MPa | 1.07 | 1.30 | 1.13 | 1.31 | 1.51 | 1.52 |
| Strength | TB | | 2.94 | 3.26 | 3.31 | 3.67 | 3.52 | 3.36 |
| (ASTM D412) | EB | % | 660 | 652 | 675 | 674 | 604 | 580 |
| Hand peel adhesion | On Motar | | AF | AF | AF | AF | AF | AF |
| | On Anodized Al | | AF | AF | AF | AF | CF | AF |
| | On stainless steel | | AF | AF | AF | AF | AF | AF |
| | On Glass | | CF | CF | CF | CF | CF | CF |
| | On PVC | | AF | AF | AF | AF | AF | AF |
| | On PC | | AF | AF | AF | AF | AF | AF |
| | On ABS | | AF | AF | AF | AF | CF | AF |
| | On Pine Wood | | CF | AF | AF | AF | CF | AF |

Table 6 depicts the results of measurements performed on Examples 3-8, which are compositions including a mixture of silyl terminated polymer and 10 wt % polypropylene carbonate polyols (Ex 3), and a high grade silyl terminated polymer and 10 wt % polypropylene carbonate polyols (Ex 4-8). As shown in Table 6, Examples 4-8 demonstrate good stability between first and second measurements. Examples 4-8 show improve curing, tack, hardness, modulus (M100), tensile strength (TB), elongation (EB) compared with Example 3, which uses a different silyl terminated polymer.

COMMERCIAL APPLICATIONS

The composition can be used as a curable composition for various applications. For example, in a coating composition, one might use a composition include silyl terminated polymers, such as those used in Examples 1-3, to achieve a balance of viscosity, toughness and weather durability.

Alternatively, for an adhesive composition, one might use a composition include silyl terminated polymers, such as those used in Examples 4-8 to achieve improved tensile strength.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A composition, comprising:
a mixture of silyl terminated polymers, wherein the silyl terminated polymers includes a monomer unit represented by —($R_1$O)—, and a terminal silicon-containing group, wherein R1 is a linear or branched alkyl group, wherein the mixture of silyl terminated polymers includes a linear silyl terminated polymer and a branched silyl terminated polymer; and
a polyether carbonate polyol including a terminal hydroxyl group.

2. The composition of claim 1, wherein the polyether carbonate polyol includes a monomer unit represented by —($R_3$—O—(C=O)O)—, wherein $R_3$ is a linear or branched alkyl group.

3. The composition of claim 2, wherein $R_3$ is —$CH_2CH(CH_3)$—.

4. The composition of claim 1, where the polyether carbonate polyol includes a block of a first monomer unit represented by —($R_2$O)— and a block of a second monomer unit represented by —($R_3$—O—(C=O)O)—, wherein $R_2$ is a linear or branched alkyl group, and wherein $R_3$ is absent, or a linear or branched alkyl group.

5. The composition of claim 4, wherein $R_2$ is —$CH_2CH(CH_3)$—.

6. The composition of claim 1, wherein an amount of the mixture of silyl terminated polymers ranges from about 10 to about 60 wt % based on the total weight of the composition.

7. The composition of claim 1, wherein an amount of the polyether carbonate polyol ranges from about 2.5 to about 40 wt % based on the total weight of the composition.

8. The composition of claim 1, wherein the composition is a sealant composition.

9. The composition of claim 1, wherein the composition is an adhesive composition.

10. The composition of claim 1, wherein the composition is a coating composition.

11. A composition, comprising:
a silyl terminated polymer, wherein the silyl terminated polymer includes a monomer unit represented by —($R_1$O)—, and a terminal silicon-containing group, wherein R1 is a linear or branched alkyl group; and
a polyether carbonate polyol including a terminal hydroxyl group and a block of a first monomer unit represented by —(R$_2$O)— and a block of a second monomer unit represented by —(R$_3$—O—(C=O)O)—, wherein R$_2$ is a linear or branched alkyl group, and wherein R$_3$ is absent, or a linear or branched alkyl group.

12. The composition of claim 11, wherein R$_3$ is —CH$_2$CH(CH$_3$)—.

13. The composition of claim 11, wherein R$_2$ is —CH$_2$CH(CH$_3$)—.

14. The composition of claim 11, wherein an amount of the silyl terminated polymer ranges from about 10 to about 60 wt % based on the total weight of the composition.

15. The composition of claim 11, wherein an amount of the polyether carbonate polyol ranges from about 2.5 to about 40 wt % based on the total weight of the composition.

16. The composition of claim 11, wherein the composition is a sealant composition.

17. The composition of claim 11, wherein the composition is an adhesive composition.

18. The composition of claim 11, wherein the composition is a coating composition.

* * * * *